United States Patent [19]
Wilson

[11] 3,848,637
[45] Nov. 19, 1974

[54] HIGH SPEED FOUR-WAY VALVE

[75] Inventor: George A. Wilson, Pineville, Pa.

[73] Assignee: I-T-E Imperial Corporation, Spring House, Pa.

[22] Filed: May 7, 1973

[21] Appl. No.: 357,666

[52] U.S. Cl.................... 137/625.27, 137/625.43
[51] Int. Cl..................... F16k 11/02, F16k 11/07
[58] Field of Search..... 137/625.65, 625.27, 625.43, 137/625.5, 625.68; 251/137, 282

[56] References Cited
UNITED STATES PATENTS

| | | | |
|---|---|---|---|
| 876,274 | 1/1908 | Kintner | 137/625.27 X |
| 1,886,007 | 11/1932 | Goldberg | 137/625.43 X |
| 2,353,765 | 7/1944 | Mathisen | 137/625.5 X |
| 2,372,311 | 3/1945 | Brown | 137/625.43 X |
| 2,574,096 | 11/1951 | Fischer et al. | 137/625.27 X |
| 2,920,653 | 1/1960 | Wolff | 137/625.43 |
| 2,983,286 | 5/1961 | Greenawalt et al. | 137/625.43 |
| 3,045,700 | 7/1962 | Wiegers | 137/625.43 X |
| 3,548,877 | 12/1970 | Aumayer | 137/625.65 |
| 3,589,400 | 6/1971 | Bruyn | 137/625.43 |

Primary Examiner—William R. Cline
Assistant Examiner—Robert J. Miller
Attorney, Agent, or Firm—Ostrolenk, Faber, Gerb & Soffen

[57] ABSTRACT

A high speed, four-way valve has a high-pressure and low-pressure port which are respectively connected to a first and second outlet port. Operation of the valve switches the connection of the high-pressure and low-pressure ports to the second and first outlet ports, respectively.

5 Claims, 2 Drawing Figures

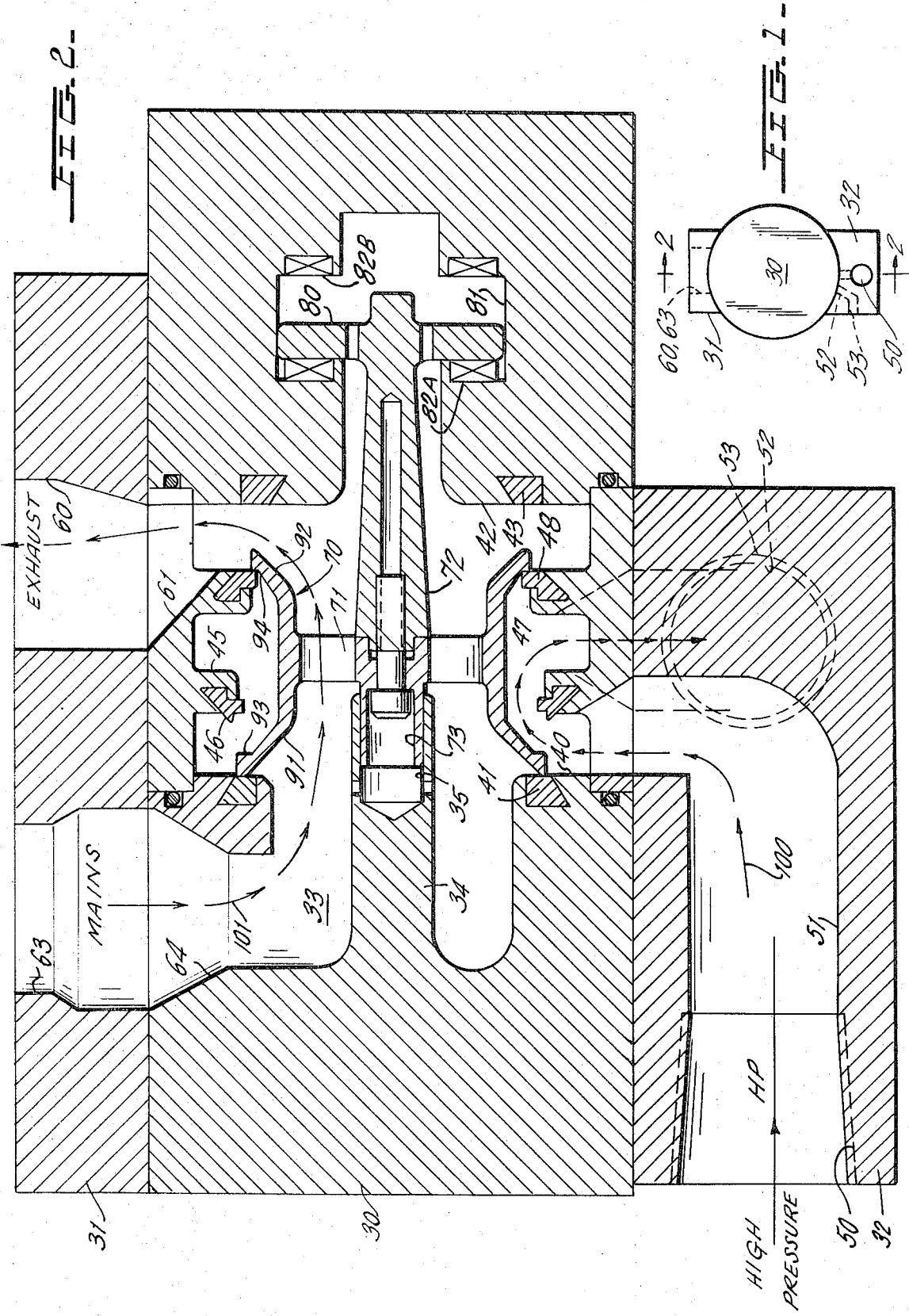
PATENTED NOV 19 1974　　3,848,637

HIGH SPEED FOUR-WAY VALVE

BACKGROUND OF THE INVENTION

This invention relates to high-speed valves, and more specifically relates to a novel high speed, four-way valve which can be applied to the control of a high speed circuit breaker. High speed valves are well known and one high speed, three-way valve is shown in U.S. Pat. No. 3,548,877 to Aumayer, assigned to the assignee of the present invention. In the valve structure of the above patent, either high or low pressure can be applied to a particular outlet port.

In accordance with the present invention, two outlet ports are provided which are selectively and interchangeably connected to a source of high-pressure gas and to a source of low-pressure gas, which are connected to two additional ports in the valve. A novel hollow sliding sleeve is provided which, in accordance with the invention, defines four movable annular sealing surfaces which cooperate with four stationary annular seals contained within the valve body. Gas flow passages are then selectively formed both inside and outside of the hollow sleeve, whereas in the Aumayer U.S. Pat. No. 3,548,877, a gas flow passage is formed only through the center of the movable valve sleeve.

A further advantage of the present valve structure is that no sliding seal is employed.

Finally, the sliding sleeve of the present invention has two enlarged diameter ends of different diameters, thereby to create self-sealing forces on the valve sleeve regardless of the valve sleeve position.

BRIEF DESCRIPTION OF THE DRAWINGS

FIG. 1 is an end plan view of the novel valve structure of the invention.

FIG. 2 is a cross-sectional view of FIG. 1 taken across the section line 2—2 in FIG. 1.

DETAILED DESCRIPTION OF THE PREFERRED EMBODIMENT

Referring now to FIGS. 1 and 2, the valve consists of a main valve body 30 which may be cylindrical and which has port blocks 31 and 32 appropriately connected thereto. Body 30 then contains a centrally disposed chamber 33 encircling a support projection 34 which has a hollow end region 35. A right-hand facing shoulder 40 within chamber 33 contains a stationary sealing gasket 41 while the opposite shoulder 42 within chamber 33 contains another sealing gasket 43. A radially disposed projecting section 45 of body 30 then carries a stationary annular sealing gasket 46 and an axially spaced projecting section 47 of body 30 carries a sealing gasket 48. Note that the sealing gaskets 41, 46, 48 and 43 respectively comprise first, second, third and fourth serially disposed and axially spaced annular seal elements.

A connection port 50, which extends into block 32, communicates with a channel 51 which terminates in a region between the first and second seals 41 and 46. Port 50 could be connected, for example, to high pressure in one application of the valve.

Block 32 contains a further channel 52 connected to an outlet port 53, where the channel 52 communicates with a region between the spaced second and third seals 46 and 48. The cylindrical port 53 could be connected to some operating piston in one embodiment of the invention.

A further port 60 in block 31 communicates with an appropriate channel 61 in body 30 which is between the third and fourth seals 48 and 43. The port 60 can, for example, be connected to low pressure in one application of the valve of the invention.

The fourth port of the valve consists of port 63 which communicates with a channel 64 in body 30, and communicates with the interior of the axially movable sleeve 70. Port 63 may be connected to another operating piston in one embodiment of the invention.

The axially movable sleeve 70 of FIG. 2 is carried on a spider 71 connected to a central shaft 72. The shaft 72 then has an extending region 73, which is slidably mounted within region 35 of extension 34 of valve body 31, so that the sleeve 70 is slidably guided with axial motion relative to body 30. The right-hand end shaft 72 is connected to an operating piston 80 which is movable within a cylinder 81 formed with valve body 70 (or a suitable extension thereof).

Any appropriate mechanism can be used to move shaft 72 to the right or to the left in order to operate the valve, and the particular mechanism shown in FIG. 2 includes electrical windings 82A and B which are stationarily mounted. Windings 82A and B are closely coupled to the short-circuited winding formed by conductive piston 80. Thus, the energization of windings 82A or B, as by discharging a capacitor into the windings, will induce circulating currents in piston 80 which will cause a repulsion force to be applied to the piston 80 which moves the piston rapidly to the right or to the left, depending on the last portion of the piston 80.

The sleeve 70 has two enlarged end portions 91 and 92, where the enlarged end 91 has a greater diameter than end 92. The outer ends of sleeve 70 serve as annular movable valve seals which are engageable with seals 41 and 43, respectively, when the valve sleeve 70 is in one or the other of its end positions.

Seals 46 and 48 are so arranged that they will engage the outwardly disposed valve seal surfaces 93 and 94, respectively, of ends 91 and 92, respectively, when the outer sleeve ends engage seals 43 and 41, respectively. Thus, first, second, third and fourth serially disposed and axially spaced movable annular seal elements are formed by the left-hand end of sleeve 70, surface 93, surface 94, and the right-hand end of sleeve 70, respectively.

It is now possible to consider the operation of the novel valve for its application to switching pressures between outlet ports 53 and 63 when a high-pressure source is applied to port 50 and a low pressure is applied to port 60.

In the position shown in FIG. 2, the high pressure connected to port 50 is connected to channel 52 through port 53. This path is shown in arrows 100 and is carried on the outside of sleeve 70 as shown. Note that high pressure is applied to the exterior surface of sleeve 70 so that, in view of the larger diameter of end portion 91 as compared to end portion 92, a larger force will be applied to the sleeve in the left-hand direction than in the right-hand direction, thereby to seal the sleeve 70 in the position shown. Note further that the main contact enclosure connected to port 63 is connected to the low-pressure region through the port 60, with this connection taking the path shown by arrows 101 through the center of the sleeve 70.

If it is now desired to switch the valve position, an impulse is applied to coil 82A, thereby applying a strong force to piston 80 which moves it to the right and which similarly moves the valve sleeve 70 to the right. While the sleeve 70 is in transit toward a sealing position against seal 43, the high-pressure port 50 is connected to the ports 60 and 63.

When the valve has fully operated to the right, the right-hand end of sleeve 70 seals against the seal 43 and, at the same time, surface 93 seals against seal 46. High pressure is then connected from port 50 through opened seal 40 to port 63. Port 53 is at low pressure by virtue of the path around the exterior of valve sleeve 70 from port 53 to port 60. Moreover, once the valve sleeve 70 seats in its right-hand position, a differential pressure is created on the valve sleeve and against the interior of enlarged diameter region 91 which tends to maintain and press the sleeve 70 toward its right-hand sealed position.

The valve may then be returned to the position shown in FIG. 2 by energizing winding 82B. This initially opens the seal at valve seal 43 and enables the high-speed movement of the valve sleeve 70 to its left-hand position.

While the valve disclosed herein is described in connection with application to a circuit interrupter, the valve may be generally used in any four-way valve application. Moreover, the ports can be controllably interchanged, depending upon the desired application. Moreover, if a three-way valve is desired instead of a four-way valve, one of the ports can be closed and the device may then be used in a three-way valve application.

Although there has been described a preferred embodiment of this novel invention, many variations and modifications will now be apparent to those skilled in the art. Therefore, this invention is to be limited, not by the specific disclosure herein, but only by the appended claims.

The embodiments of the invention in which an exclusive privilege or property is claimed are defined as follows:

1. A high speed, four-way valve comprising, in combination:
   a valve body having a central chamber;
   a hollow cylindrical valve sleeve disposed within said central chamber and movable therein in a direction along its axis; said sleeve having first and second, third and fourth serially disposed and axially spaced annular seal elements; said first and third annular seal elements facing toward one axial direction of said sleeve; said second and fourth annular seal elements facing toward the other axial direction of said sleeve;
   first, second, third and fourth serially disposed and axially spaced stationary annular seals fixed within said central chamber and sealingly engageable, respectively, with said first, second, third and fourth annular seal elements; said first and third annular seal elements simultaneously engaging said first and third stationary annular seals, respectively, when said valve sleeve is in a first axial position; said second and fourth annular seal elements engaging said second and fourth stationary annular seals, respectively, when said valve sleeve is in a second axial position;
   and first, second, third and fourth ports extending through said valve body and into said central chamber; said first port communicating with the hollow interior of said cylindrical valve sleeve; said second port communicating between said first and second stationary annular seals; said third port communicating between said second and third stationary annular seals; said fourth port communicating between said third and fourth stationary annular seals;
   said sleeve having first and second enlarged diameter end regions; the outer axial ends of said first and second enlarged diameter end regions defining said first and fourth annular seal elements; interior regions of said first and second enlarged diameter end regions opposing said first and fourth annular seal elements defining said second and third annular seal elements, respectively.

2. The high speed valve of claim 1 which further includes operating piston means for operating said valve sleeve between its said first and second axial positions; said valve sleeve having an internal spider connected to said operating piston means.

3. The high speed valve of claim 1 wherein said first enlarged diameter end region has a greater diameter than said second enlarged diameter end region.

4. The high speed valve of claim 3 which further includes operating piston means for operating said valve sleeve between its said first and second axial positions; said valve sleeve having an internal spider connected to said operating piston means.

5. The high speed valve of claim 3 wherein said second and fourth ports are connected to high and low pressure regions, respectively.

* * * * *